United States Patent
Ohya et al.

(10) Patent No.: US 6,756,696 B2
(45) Date of Patent: Jun. 29, 2004

(54) WIND POWER GENERATOR

(75) Inventors: Yuji Ohya, Chikushino (JP); Takashi Karasudani, Fukuoka (JP); Akira Sakurai, Fukuoka (JP); Masahiro Inoue, Fukuoka (JP); Nobutaka Fukamachi, Fukuoka (JP); Kimihiko Watanabe, Fukuoka (JP)

(73) Assignee: Kyusho TLO Company, Limited, Fukuoka (JP)

( * ) Notice: Subject to any disclaimer, the term of this patent is extended or adjusted under 35 U.S.C. 154(b) by 0 days.

(21) Appl. No.: 10/357,231

(22) Filed: Feb. 3, 2003

(65) Prior Publication Data

US 2003/0178856 A1 Sep. 25, 2003

(30) Foreign Application Priority Data

Mar. 22, 2002 (JP) ........................................ 2002-081808

(51) Int. Cl.$^7$ ................................................. F03D 9/00
(52) U.S. Cl. ...................................... 290/55; 415/208.1
(58) Field of Search ........................... 290/44, 55, 43.54; 415/208.1

(56) References Cited

U.S. PATENT DOCUMENTS

| | | | | |
|---|---|---|---|---|
| 4,021,135 A | * | 5/1977 | Pedersen et al. ......... | 415/208.2 |
| 4,258,271 A | | 3/1981 | Chappell et al. | |
| 4,324,985 A | * | 4/1982 | Oman ......................... | 290/55 |
| 4,411,588 A | * | 10/1983 | Currah, Jr. ................. | 415/220 |
| 4,482,290 A | | 11/1984 | Foreman et al. | |
| 4,684,316 A | * | 8/1987 | Karlsson ................. | 415/211.1 |
| 4,720,640 A | * | 1/1988 | Anderson et al. ............. | 290/43 |
| 5,464,320 A | | 11/1995 | Finney | |
| 6,246,126 B1 | * | 6/2001 | Van Der Veken et al. .... | 290/55 |

FOREIGN PATENT DOCUMENTS

| | | | | |
|---|---|---|---|---|
| DE | 20115248 U1 | * | 11/2001 | ............. F03D/1/04 |
| GB | 1450348 | * | 9/1976 | |
| JP | 51-67943 | | 5/1976 | |
| JP | 59-007784 | | 1/1984 | |
| JP | 2001-055969 | | 2/2001 | |
| JP | 2002-213343 | | 7/2002 | |

* cited by examiner

*Primary Examiner*—Joseph Waks
(74) *Attorney, Agent, or Firm*—Jordan and Hamburg LLP

(57) ABSTRACT

Wind power generator including a wind turbine rotating in a cylindrical wind tunnel body and capable of generating high output power by accelerating a wind flow. The wind tunnel body expands toward a wind flow direction and the wind turbine is arranged adjacent to a wind inlet of the wind tunnel body. An angle of inclination of a side wall portion of the wind tunnel body against an axis of the wind tunnel body is in a range from 5 to 25 degrees. The inlet of the wind tunnel body has a curved surface smoothly expanding toward an outside of the wind tunnel body. A collar-shaped brim is formed on an outside of an opening edge of a wind outlet of the wind tunnel body. Wind flowing into the wind tunnel body sharply accelerates immediately after passing through the inlet and rotates the wind turbine.

5 Claims, 8 Drawing Sheets

US 6,756,696 B2

WIND POWER GENERATOR

BACKGROUND OF THE INVENTION

The present invention relates to a wind power generator that produces high output power of electricity by increasing wind flow speed.

Recently, in the field of power generation, wind power generators are attracting attention from such aspects as the breakaway from oil-based energy production and conservation of clean environment. Wind power generators, which utilize a natural wind flow, sometimes fail to produce sufficient wind power depending on geographical and weather conditions where generators are installed. Therefore, it has been suggested that by employing some means to generate sufficient power a weak wind flow is accelerated.

The present inventors have provided a wind speed-up device capable of efficiently increasing wind flow speed with a simple structure, which is disclosed in Unexamined Japanese Patent Publication No. 2002-213343. FIG. 8 is a longitudinal sectional view showing the wind speed-up device in Unexamined Japanese Patent Publication No. 2002-213343.

The wind speed-up device illustrated in FIG. 8 comprises a wind tunnel body 51 having a long cylindrical shape and expanding from an inlet 52 toward an outlet 53 through which wind flows. On an opening edge of the inlet 52 of the wind tunnel body 51 provided is an inlet shroud 55 opened outwardly with a curved surface. An opening edge of the outlet 53 is provided with a collar-shaped flange 56 that outwardly expands. An area adjacent to the inlet 52 is adopted for a position for outputting the generated wind power.

By the above structure, wind around a central axis of the wind tunnel body 51, flowing in from the front of the inlet 52, pulls in slow wind flowing along an inner wall surface of the wind tunnel body 51 and, on the rear side of the outlet 53, the wind around the central axis and wind flowing outside the wind tunnel body 51 pull in the slow wind flowing on the inner wall surface of the wind tunnel body 51, thereby obtaining a high-speed wind area adjacent to the inlet 52 inside the wind tunnel body 51 to output wind power.

By employing the above-described wind speed-up device to construct a wind power generator with a wind turbine for generating electricity disposed at a position for outputting wind power adjacent to the inlet 52, the wind turbine disposed at the position adjacent to the inlet 52 inside the wind tunnel body 51, which is a high-speed wind area in the wind tunnel body 51 of the wind speed-up device, can be efficiently rotated even by weak wind outside, which leads to a significant improvement in power generating ability as a wind power generator.

In the wind speed-up device of Unexamined Japanese Patent Publication No. 2002-213343, it is further suggested that the angle of inclination of a side wall portion against the axis of the wind tunnel body 51 be preferably in a range from 2 to 5 degrees. With the angle of inclination below 2 degrees, even when the ratio of the length of the wind tunnel body 51 to the diameter of the inlet 52 of the wind tunnel body 51 is increased, the effect of increasing the speed-up ratio tends to become smaller. With the angle of inclination above 5 degrees, the effect of pulling in the slow wind flowing on the inner wall surface of the wind tunnel body tends to become smaller. Accordingly, with a range from 2 to 5 degrees, the slow wind flowing on the inner wall surface of the wind tunnel body can be efficiently pulled in.

However, although the above-described wind speed-up device, when used as itself, has the greatest speed-up effect with a range from 2 to 5 degrees, the device provided with a wind turbine disposed for generating electricity adjacent to the inlet 52 of the wind tunnel body 51 has proven not to be most appropriate with the angle of inclination in a range from 2 to 5 degrees. This is because the wind turbine rotating within the wind tunnel body 51 has an influence on a wind flow passing through the wind tunnel body 51.

An object of the present invention is to provide a wind power generator having a wind turbine rotating inside a wind tunnel body, which can generate high output power by efficiently increasing wind flow speed.

SUMMARY OF THE INVENTION

A wind power generator according to the present invention is a wind power generator comprising a cylindrical wind tunnel body expanding toward a flowing direction of wind and a wind turbine for generating electricity disposed at a position adjacent to an inlet for a wind flow of the wind tunnel body, wherein an angle of inclination of a side wall portion of the wind tunnel body against an axis of the wind tunnel body is in a range from 5 to 25 degrees or, preferably, from 5 to 14 degrees.

FIGS. 1 and 2 show distribution of static pressure and wind velocity at positions from the front through the inside to the rear of the wind tunnel body. The horizontal axes in FIGS. 1 and 2 indicate a ratio obtained by normalizing a horizontal position X of which origin is the inlet of the wind tunnel body by length L of the wind tunnel body, where the direction of the outlet of the wind tunnel body is indicated as positive. The distribution of static pressure in FIG. 1 indicates the difference from the static pressure in a position free from influence of the wind tunnel body, and the vertical axis shows a ratio obtained by normalizing the difference in static pressure by dynamic pressure of approach wind velocity U∞. The vertical axis of FIG. 2 shows a ratio obtained by normalizing wind velocity U by the approach wind velocity U∞.

As shown in FIG. 1, with respect to the wind tunnel body disposed at an open space, the static pressure of wind both in front of the inlet and at the rear of the outlet is substantially equal to the static pressure of atmospheric pressure outside the wind tunnel body. In the case of the cylindrical wind tunnel body expanding toward a flowing direction of wind, as the static pressure inside the wind tunnel body increases in a direction toward the outlet as shown in FIG. 1, the pressure greatly drops around the inlet inside the wind tunnel body. Accordingly, wind flowing in from the front of the inlet into the wind tunnel body sharply accelerates around the inlet as shown in FIG. 2 and gradually decelerates toward the outlet while the pressure is recovered to become substantially equal to the static pressure of the atmospheric pressure at the outlet as shown in FIG. 1.

In other words, in the cylindrical wind tunnel body expanding toward a flowing direction of wind, wind has negative pressure and converges around a position on a slightly downstream side of the inlet inside the wind tunnel body, which provides an area of high-speed wind to output wind power thereat.

In a wind power generator of the present invention, a wind turbine for generating power is disposed at a position adjacent to the inlet of the wind tunnel body. Thus, resistance by the wind turbine itself can prevent separation of a wind flow on an inner wall surface of the wind tunnel body even if an angle of inclination of a side wall portion against an axis of the wind tunnel body is increased to more than 5 degrees. Furthermore, since rotation of the wind turbine accelerates flow rate of wind in a radial direction of the wind tunnel body, the wind flow on the inner wall surface of the wind tunnel body is further prevented from separating, and wind flowing in from the inlet of the wind tunnel body can smoothly flow along the inner wall surface of the wind tunnel body to the outlet. Therefore, even if the angle of inclination of the side wall portion is increased up to 25 degrees at the maximum, separation of the wind flow on the inner wall surface of the wind tunnel body can be prevented until the wind flow reaches the outlet.

When the angle of inclination of the side wall portion exceeds 14 degrees, separation of wind on the inner wall surface of the wind tunnel body shows a slight tendency to occur. However, with high-speed rotation of the wind turbine for generating electricity, the wind flow can be reattached to the inner wall surface of the wind tunnel body. Separation of wind can be thus controlled in a small range also in this case so that wind fed from the inlet of the wind tunnel body can flow smoothly along the inner wall surface of the wind tunnel body to the outlet.

Namely, in the wind power generator according to the present invention, wind fed from the inlet of the wind tunnel body can flow smoothly along the inner wall surface of the wind tunnel body to the outlet without causing separation of wind from the inner wall surface of the wind tunnel body. Therefore, the wind flow made to have negative pressure around the inlet of the wind tunnel body can recover pressure without a great flow loss until reaching the outlet, thereby efficiently accelerating wind velocity to generate high output power.

The optimal value of the angle of inclination of the side wall portion of the wind tunnel body varies depending on a resistance coefficient of the wind turbine. However, with the angle of inclination of the side wall portion ranging from 5 to 14 degrees, in particular, no separation of wind flowing along the inner wall surface of the wind tunnel body is generated at all as discussed above, which results in the maximum rate of pressure recovery, enabling most efficient acceleration of wind velocity to generate high output power.

With the angle of inclination below 5 degrees, where the efficiency of recovering pressure remains in a small value, negative pressure around the inlet does not increase enough to obtain great acceleration of wind around a position where the wind turbine is disposed. On the other hand, when the angle of inclination exceeds 25 degrees, separation of wind on the inner wall surface of the wind tunnel body occurs to cause a considerably large flow loss, which leads to lower efficiency of recovering pressure and failure to obtain large acceleration of wind.

In the wind power generator according to the present invention, it is preferable that the inlet of the wind tunnel body has a curved surface which smoothly expands toward an outside of the wind tunnel body or an upstream side of wind flowing in the wind tunnel body. By this structure, wind in the proximity of a front of the inlet of the wind tunnel body can be smoothly fed into the wind tunnel body, and the flow rate of the fed wind is increased in a radial direction by rotation of the wind turbine for generating electricity disposed adjacent to the inlet. Accordingly, separation of wind from the inner wall surface of the wind tunnel body around the inlet can be further prevented, realizing an area of high-speed wind more efficiently to generate high output power.

It is also preferable that the wind power generator of the present invention further comprises a collar-shaped brim formed on an outside of an opening edge of the outlet. By this structure, wind flowing outside the wind tunnel body collides with the collar-shaped brim and forms a strong vortex on a rear side of the collar-shaped brim, which causes low pressure around the outlet of the wind tunnel body. Therefore, it is possible to pull a stronger flow of wind into the wind tunnel body, thereby realizing an area of high-speed wind more efficiently to generate high output power.

Preferably, the collar-shaped brim has a width from 10 to 100% of a minimum inside diameter of the wind tunnel body. With a wind tunnel body having length larger than the minimum inside diameter of the wind tunnel body (that is, where the length of the wind tunnel body is L and the minimum inside diameter of the wind tunnel body is D, L/D>1), when the width of the collar-shaped brim is increased to 50%, 75% and 100% in sequence, for example, a stronger vortex is generated on the rear side of the collar-shaped brim, which makes pressure around the outlet much lower than static pressure of atmospheric pressure. As a result, a force pulling the wind flow from the inlet becomes larger, which leads to acceleration of wind velocity around the inlet.

On the other hand, when the wind tunnel body has length smaller than the minimum inside diameter of the wind tunnel body, that is, L/D<1, an excessively large collar-shaped brim adversely blocks the wind flow and raises pressure on the upstream side by itself, thereby hindering wind from flowing into the wind tunnel body. Accordingly, when L/D is equal or close to 1, optimum width of the collar-shaped brim is approximately 50% of the minimum inside diameter of the wind tunnel body.

DESCRIPTION OF THE PREFERRED EMBODIMENT

Figure 1:
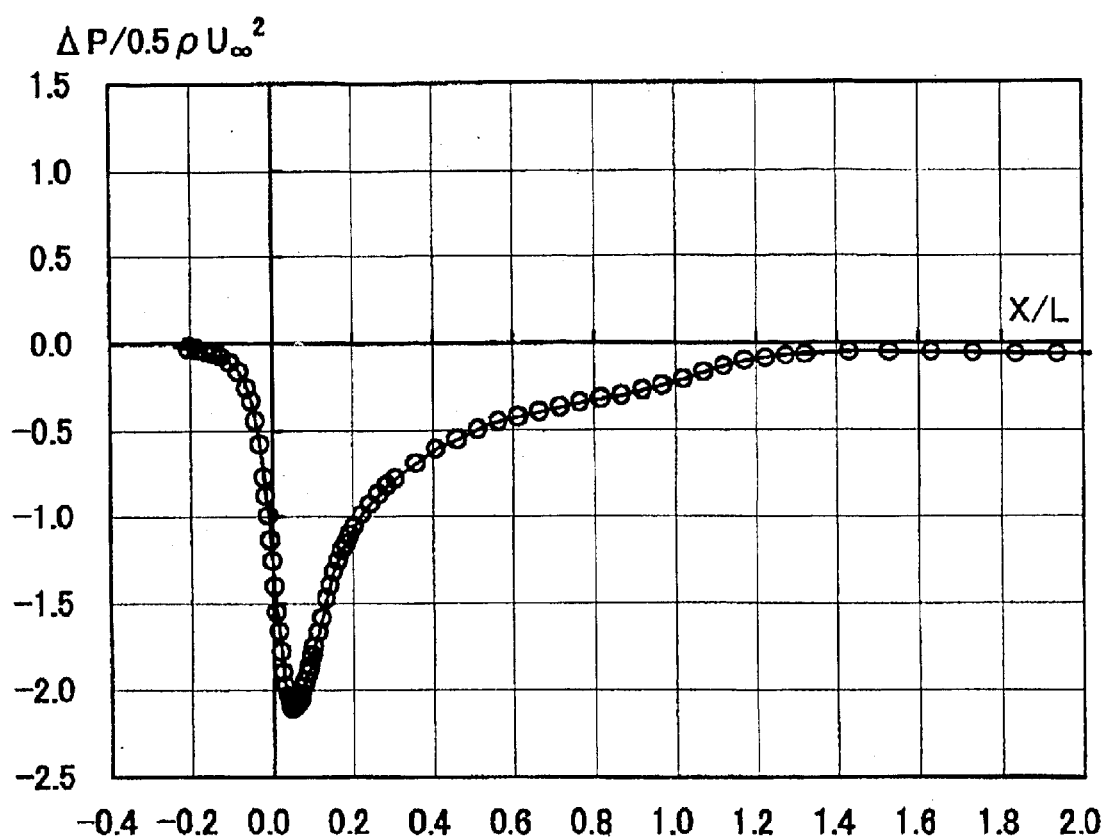
FIG. 1 is a diagram showing distribution of static pressure.
Figure 2:
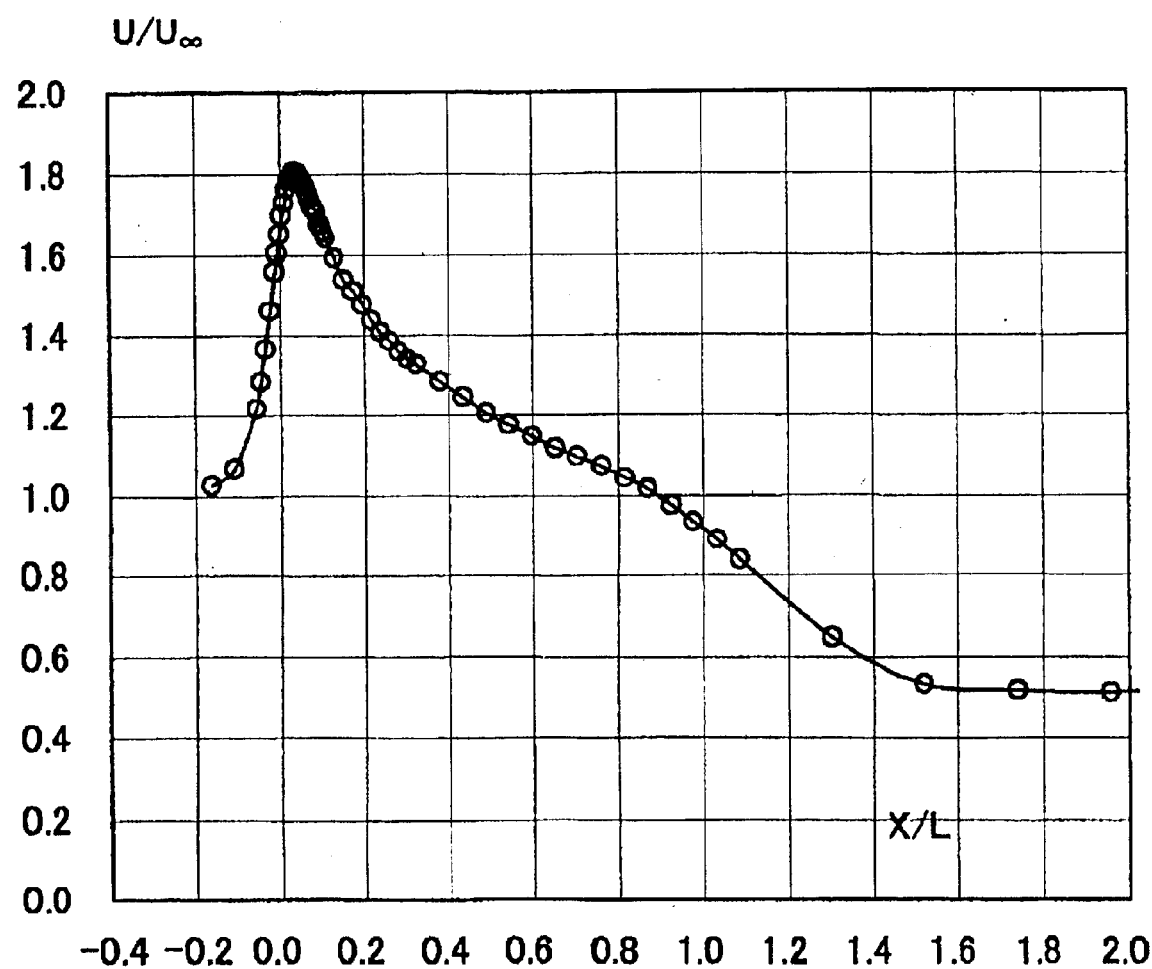
FIG. 2 is a diagram showing distribution of wind velocity.
Figure 3:
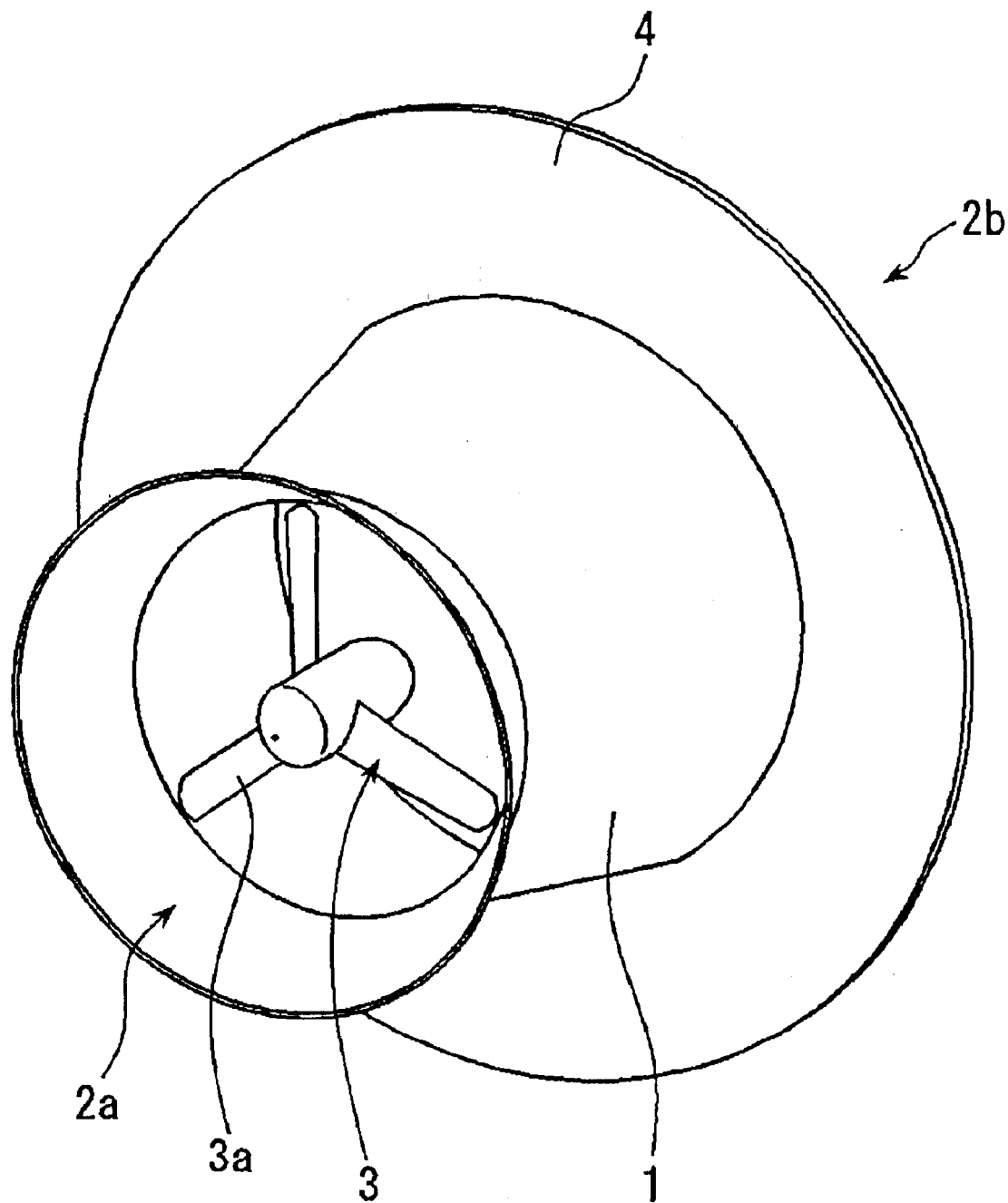
FIG. 3 is a perspective view of a wind power generator of an embodiment according to the present invention.
Figure 4:
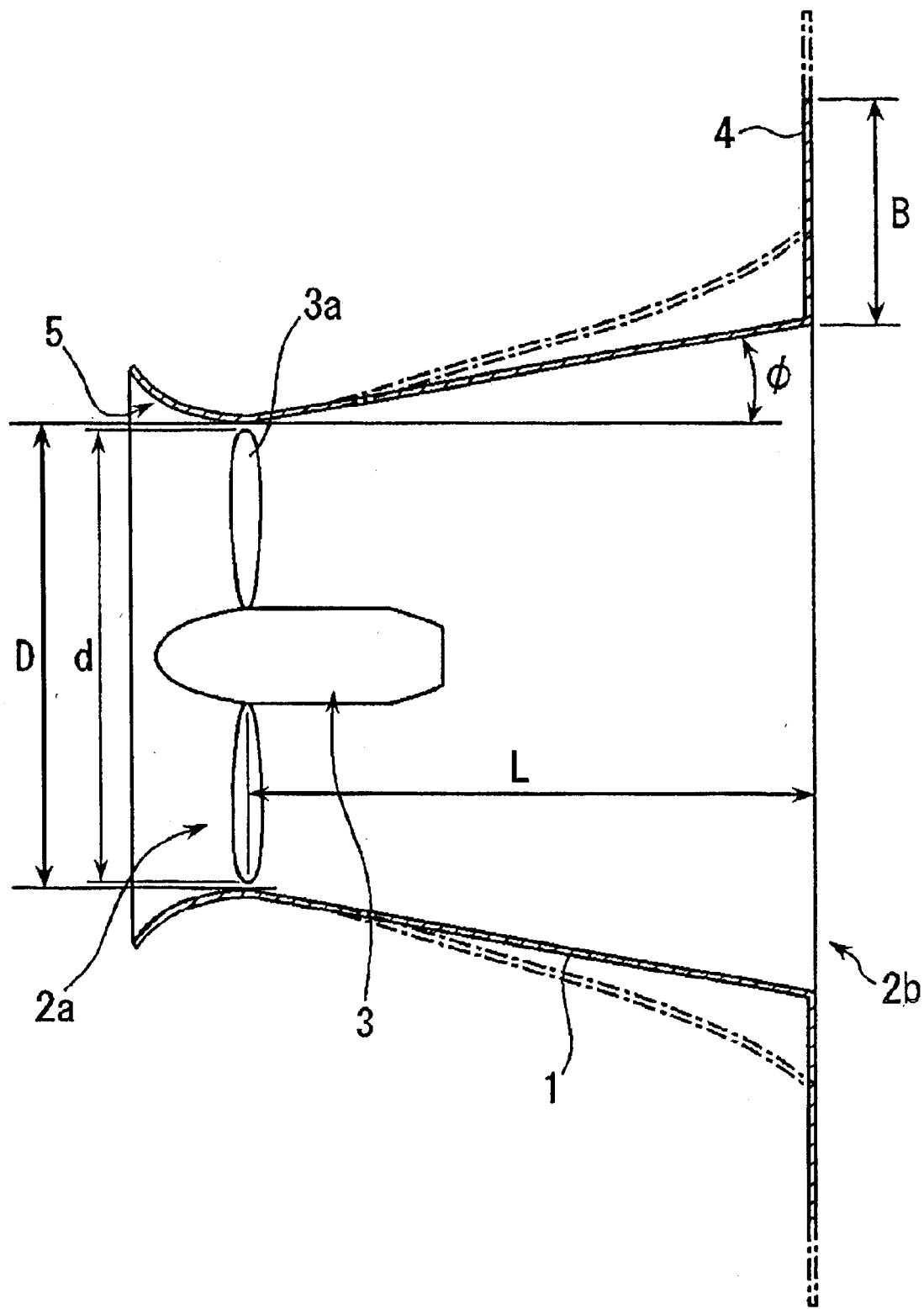
FIG. 4 is a longitudinal sectional view of FIG. 3.

FIG. 3 is a perspective view of a wind power generator of an embodiment according to the present invention, and FIG. 4 is a longitudinal sectional view of FIG. 3.

As shown in the figures, the wind power generator of the present invention comprises a cylindrical wind tunnel body 1 and a wind turbine 3 for generating electricity, the wind turbine 3 being disposed at a position adjacent to an inlet 2a for wind of the wind tunnel body 1 and wind power being outputted at the position. Moving blades 3a of the wind turbine 3 rotate with some amount of clearance (approximately 1 to 2% of a minimum inside diameter D of the wind tunnel body) so as not to touch an inner wall surface of the wind tunnel body.

The wind tunnel body 1 is an expanding tube (diffuser) which expands from the inlet 2a toward an outlet 2b for wind and has length L (length from a position where the moving blades 3a of the wind turbine 3 are mounted to a position of the outlet 2b). An angle of inclination φ of a side wall portion of the wind tunnel body 1 is in a range from 5 to 25 degrees. The inlet 2a of the wind tunnel body 1 forms a curved surface 5 smoothly expanding toward an outside of the wind tunnel body 1. The outlet 2b of the wind tunnel body 1 has a collar-shaped brim 4 having width B which is 50% of the minimum inside diameter D of the wind tunnel body 1.

By disposing the wind power generator having the above structure in a flow of wind, static pressure increases from the inlet 2a to the outlet 2b of the wind tunnel body 1, and thus static pressure inside the wind tunnel body 1 has large negative pressure around the inlet 2a. Furthermore, the collar-shaped brim 4 functions in largely decreasing static pressure of wind around the outlet 2b of the wind tunnel body 1 compared to static pressure of atmospheric pressure, thereby making the pressure around the inlet 2a more negative. Therefore, wind flowing in from a front of the inlet 2a sharply accelerates around the inlet 2a.

In the wind power generator of this embodiment, the moving blades 3a of the wind turbine 3 rotating with some amount of clearance between the moving blades 3a and the inner wall surface of the wind tunnel body 1 increases flow rate of wind flowing into the wind tunnel body 1 in a radial direction. The wind flow in a radial direction and resistance by the wind turbine 3 itself prevent separation of wind flow on the inner wall surface of the wind tunnel body 1 until wind reaches the outlet 2a of the wind tunnel body 1, making wind fed from the inlet 2a of the wind tunnel body 1 smoothly flow along the inner wall surface of the wind tunnel body 1 to the outlet 2b.

Consequently, according to the wind power generator of this embodiment, wind flow made to have negative pressure inside the wind tunnel body 1 can recover pressure without a great flow loss until reaching the outlet 2b, thereby efficiently accelerating the wind velocity. In other words, in the wind power generator having the above-described structure, since wind flowing in from the inlet 2a for wind of the wind tunnel body 1 sharply accelerates immediately after passing through the inlet 2a, the wind turbine 3 disposed adjacent to the inlet 2a can be efficiently rotated to generate high output power.

In the wind power generator of this embodiment, when the angle of inclination φ of the side wall portion of the wind tunnel body 1 is in a range from 5 to 14 degrees, separation of wind flow on the inner wall surface of the wind tunnel body 1 is completely prevented, and the wind smoothly flows along the inner wall surface of the wind tunnel body 1 until reaching the outlet 2b, thereby realizing a large pressure recovery rate during a period in which the wind reaches the outlet 2b to generate the highest output of electricity.

While the wind tunnel body 1 of the above embodiment is a diffuser with a side wall portion having a form linearly expanding, the side wall portion may have a curved surface smoothly expanding as illustrated by dashed lines in FIG. 4. In the latter structure, the angle of inclination φ of the side wall portion of the wind tunnel body 1 is in a range from 5 to 25 degrees at a position adjacent to the inlet 2a. In this case, as the inner wall surface of the side wall portion of the wind tunnel body 1 smoothly expands at the position adjacent to the inlet 2a, separation of wind can be prevented around the inlet 2a while obtaining a much larger expansion rate of the side wall portion. This may further enhance efficiency of pressure recovery, which would probably lead to generation of higher power of electricity.

Results of experiments using a wind power generator model having the above structure will be described below.

Figure 5:
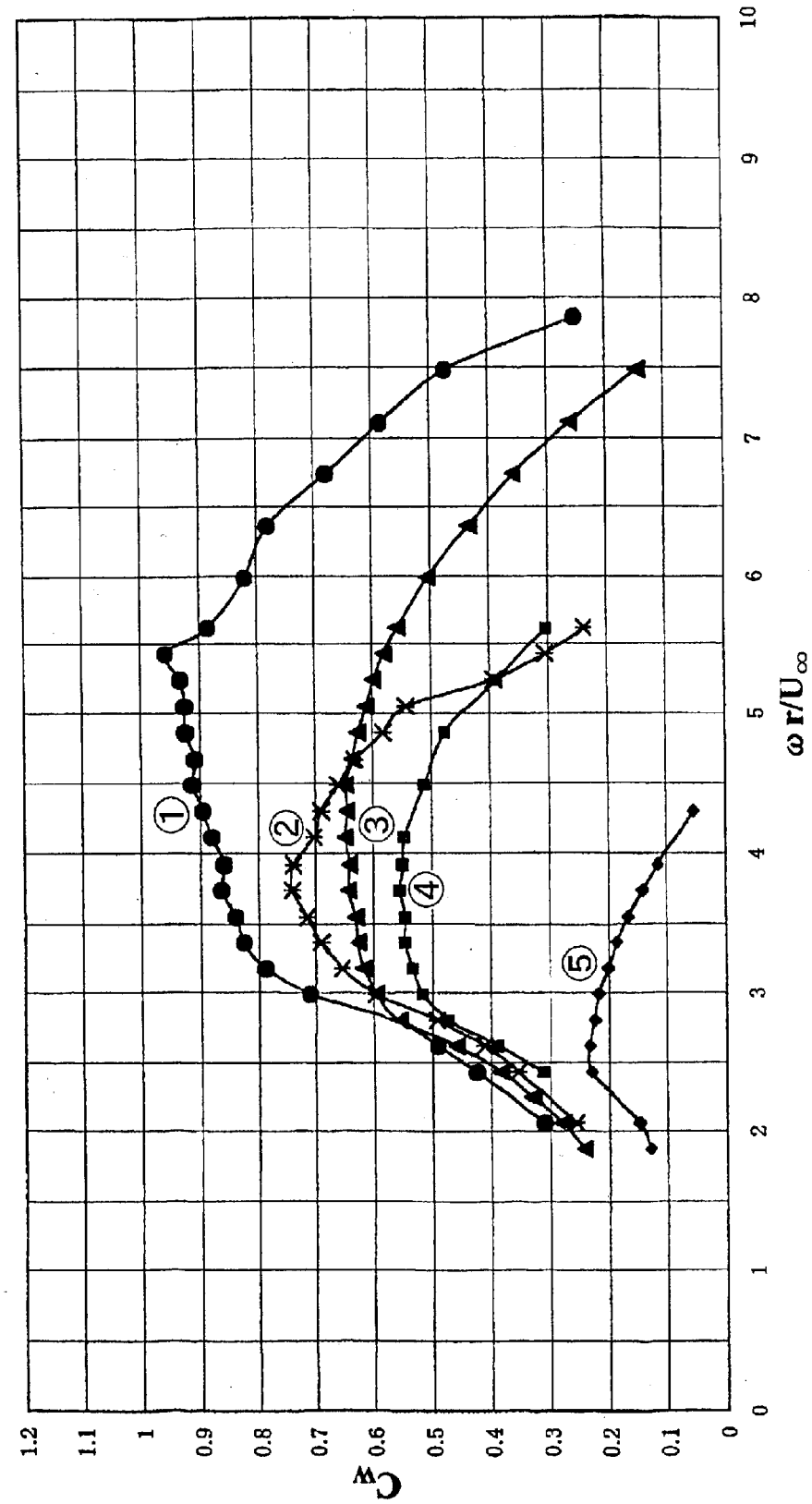
FIG. 5 is a diagram showing relation between a peripheral velocity ratio and an output coefficient.

FIG. 5 shows a relation between a peripheral velocity ratio $\omega r/U_\infty$ and an output coefficient $C_W$. In the figure, where the minimum inside diameter D of the wind tunnel body 1 is 40 cm, a ratio L/D which is the ratio of the length L of the wind tunnel body 1 to the minimum inside diameter D is 1.25, the angle of inclination φ of the side wall portion of the wind tunnel body 1 is 10 degrees, and an approach wind velocity (a flow rate of the wind approaching the wind tunnel body 1) $U_\infty$ is 11 m/s, ① is the line for a wind power generator shown in FIG. 4, ② is the line for a wind power generator of FIG. 4 excluding only the curved surface 5, ③ is the line for a wind power generator of FIG. 4 excluding only the collar-shaped brim 4, ④ is the line for a wind power generator of FIG. 4 excluding the curved surface 5 and the collar-shaped brim 4, and ⑤ is the line for the wind turbine 3 alone.

The peripheral velocity ratio $\omega r/U_\infty$ is, where a diameter of the moving blades 3a is d(m), obtained by normalizing by dividing the approach wind velocity $U_\infty$ into velocity in a peripheral direction ωr (ω: angular frequency (rad/s), r=d/2). The output coefficient $C_W$ is obtained by normalizing by dividing (½)·(air density ρ(kg/m³))·(the cubic of the approach wind velocity $U_\infty$(m/s))·(rotational area $\pi r^2$ of the moving blades 3a) into a power output (W).

As apparent from FIG. 5, when the peripheral velocity ratio $\omega r/U_\infty$ varies, each maximum value of the output coefficient $C_W$ tends to increase in the sequence of ⑤, ④, ③, ②, and ①, and the highest output coefficient $C_W$ is obtained in the wind power generator of ①.

Figure 6:
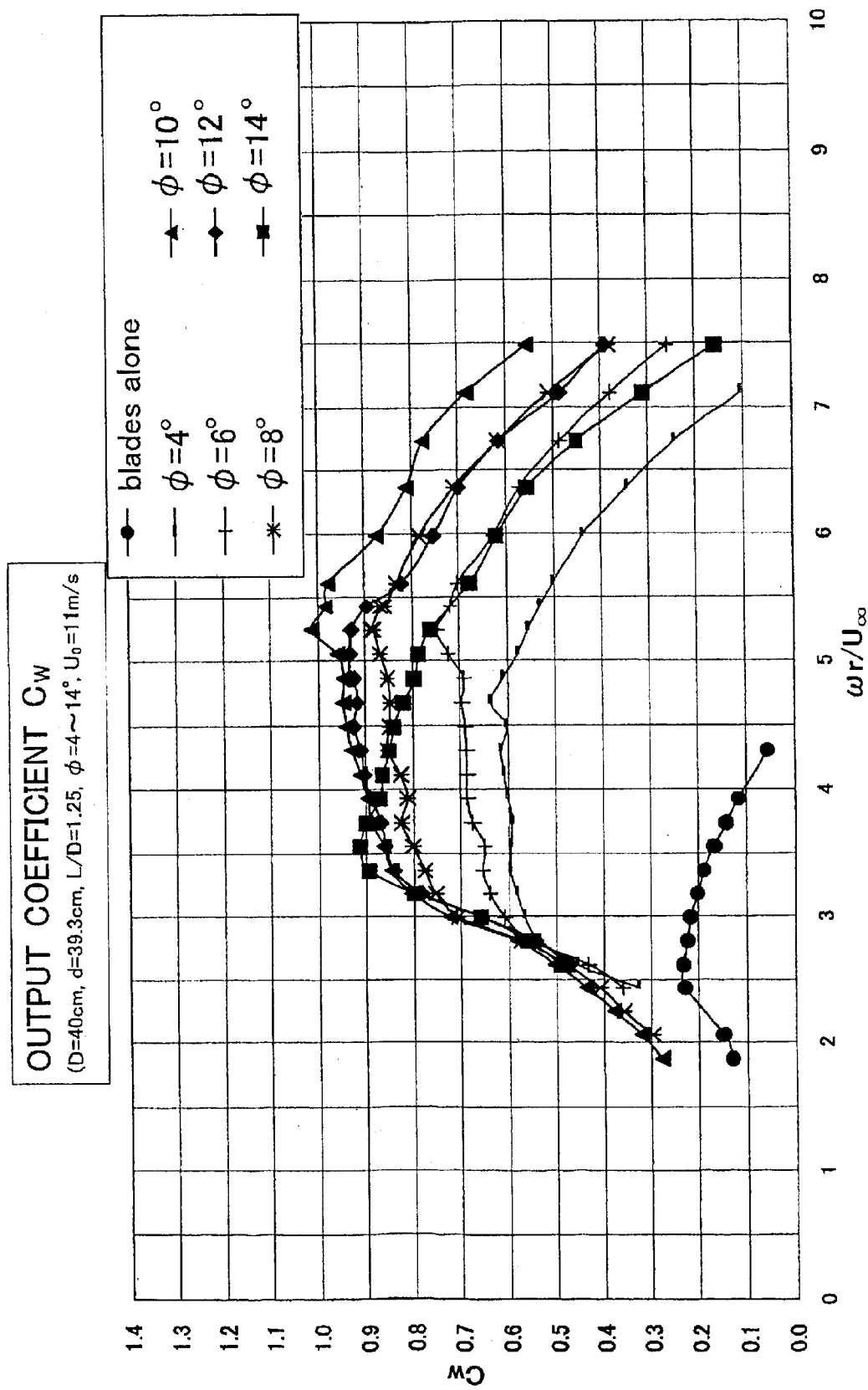
FIG. 6 is another diagram showing relation between a peripheral velocity ratio and an output coefficient.

FIG. 6 shows relation between the peripheral velocity ratio $\omega r/U_\infty$ and the output coefficient $C_W$ in the same wind power generator as the above ① where D is 40 cm, L/D is 1.25, and the approach wind velocity $U_\infty$ is 1 μm/s, when the angle of inclination φ of the side wall portion of the wind tunnel body 1 is changed in a range from 4 to 14 degrees.

As apparent from FIG. 6, when the angle of inclination φ of the side wall portion of the wind tunnel body 1 having the same structure as the above ① is changed in a range from 4 to 14 degrees, the output coefficient $C_W$ tends to increase until φ reaches 10 degrees while $C_W$ tends to decrease after φ exceeds 10 degrees.

Figure 7:
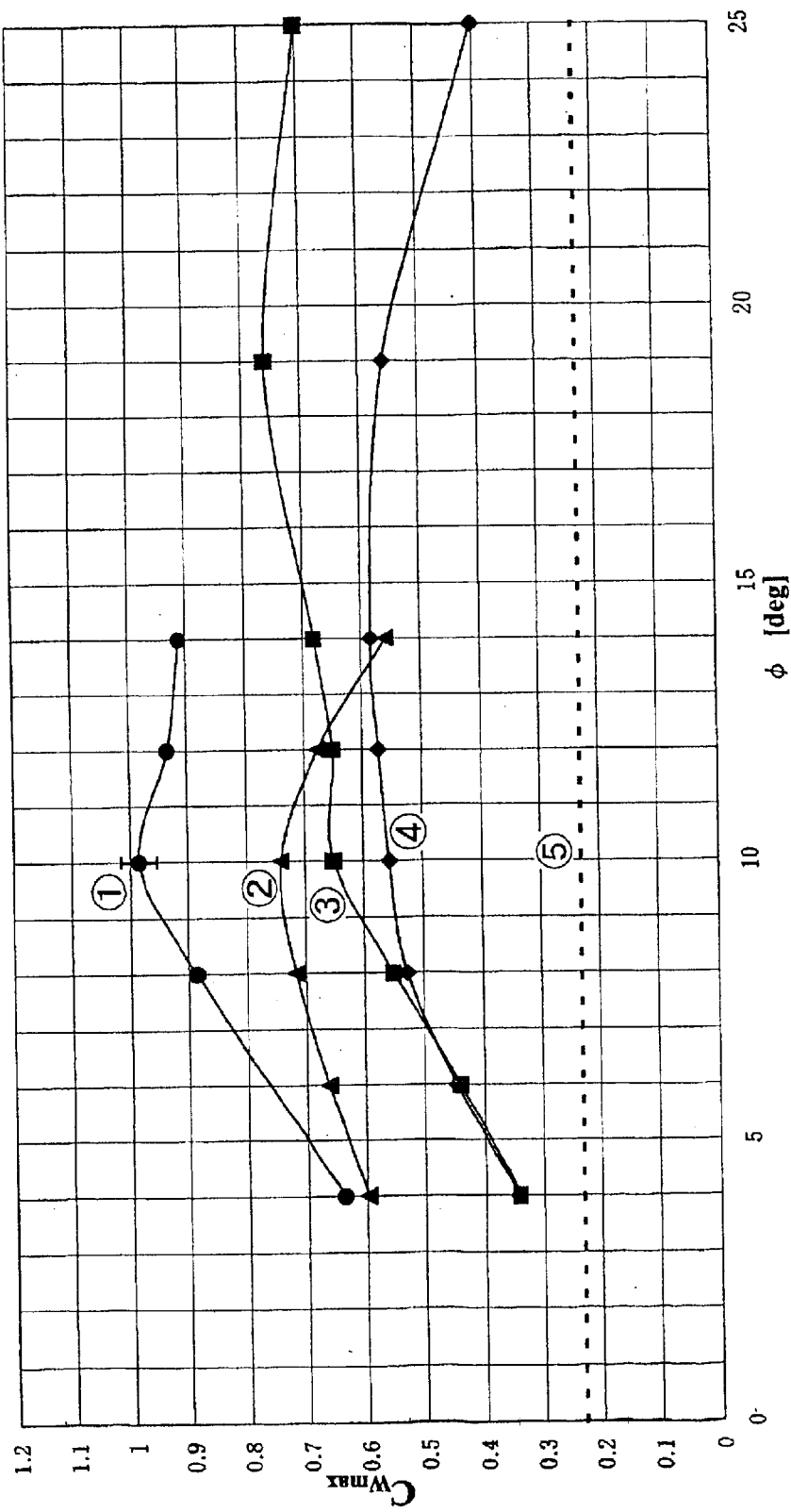
FIG. 7 is a diagram showing relation between an angle of inclination of a side wall portion of a wind tunnel body and a maximum output coefficient.
Figure 8:
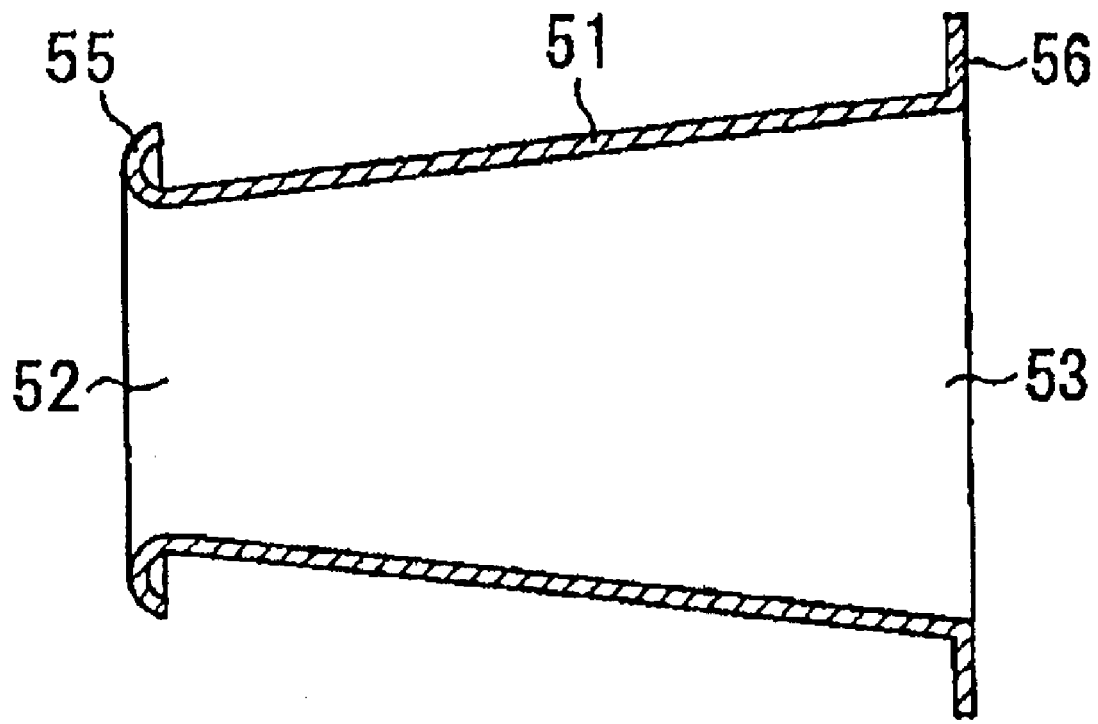
FIG. 8 is a longitudinal sectional view of a conventional wind speed-up device.

FIG. 7 shows relation between the angle of inclination φ of the side wall portion of the wind tunnel body 1 and a maximum output coefficient $C_{Wmax}$ (the maximum value of the output coefficient $C_W$) in the same wind power generators as the above ① to ⑤ where D is 40 cm, L/D is 1.25, and $U_\infty$ is 1 m/s.

As apparent from FIG. 7, in the generator having the structure of ①, the maximum output coefficient $C_{Wmax}$ reaches the utmost when φ is 10 degrees while the $C_{Wmax}$ gradually decreases after φ exceeds the best angle of 10 degrees. Moreover, $C_{Wmax}$ of the generator of the above ① is larger than any of ② to ⑤ whatever φ is.

While particular embodiments of the present invention have been shown and described, numerous variations and alternate embodiments will occur to those skilled in the art. Accordingly, it is intended that the invention be limited only by the appended claims.

What is claimed is:

1. A wind power generator comprising:

a cylindrical wind tunnel body expanding toward a flowing direction of wind, said wind tunnel body having an inlet through which wind flows into the wind tunnel body, an outlet through which the wind flows out of the wind tunnel body and a side wall portion;

a wind turbine for generating electricity arranged adjacent to the inlet of the wind tunnel body; and a collar-shaped brim formed on an outside of an opening edge of the outlet of the wind tunnel body, the collar-shaped brim having a width from 10 to 100% of a minimum inside diameter of the wind tunnel body, and an angle of inclination of the side wall portion of the wind tunnel body against relative to an axis of the wind tunnel body being in a range from 5 to 25 degrees.

2. The wind power generator according to claim 1, wherein said inlet of the wind tunnel body has a curved surface expanding smoothly toward an outside of the wind tunnel body.

3. The wind power generator according to claim 1, wherein the angle of inclination of the side wall portion of the wind tunnel body relative to the axis of the wind tunnel body is in a range from 5 to 14 degrees.

4. The wind power generator according to claim 1, wherein the width of the collar-shaped brim is variable depending on a ratio of a length of the wind tunnel body to the minimum inside diameter of the wind tunnel body.

5. The wind power generator according to claim 1, wherein the side wall portion of the wind tunnel body has a curved surface smoothly expanding with the angle of inclination being measured at a position adjacent the inlet of the wind tunnel body.

* * * * *

UNITED STATES PATENT AND TRADEMARK OFFICE
CERTIFICATE OF CORRECTION

PATENT NO. : 6,756,696 B2
DATED : June 29, 2004
INVENTOR(S) : Yuji Ohya et al.

It is certified that error appears in the above-identified patent and that said Letters Patent is hereby corrected as shown below:

<u>Title page,</u>
Item [73], Assignee, should read as follows:
-- [73]  Assignee:     Kyushu TLO Company, Limited, Fukuoka (JP) --

Signed and Sealed this

Twenty-fifth Day of January, 2005

JON W. DUDAS
*Director of the United States Patent and Trademark Office*